Feb. 9, 1932.  J. C. STEINBERG  1,844,110
DETERMINATION OF TELEPHONE QUALITY
Filed April 17, 1930   2 Sheets-Sheet 1
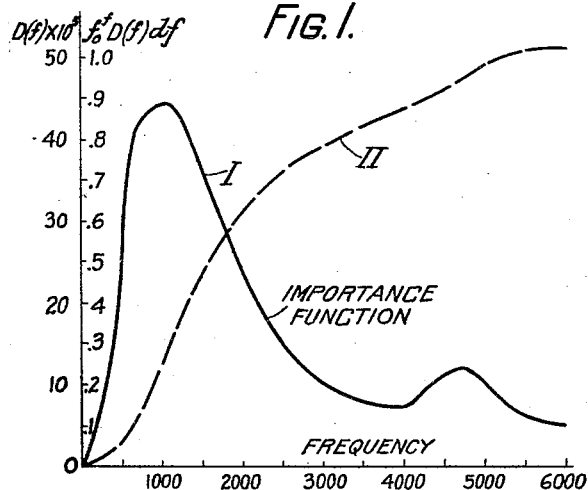
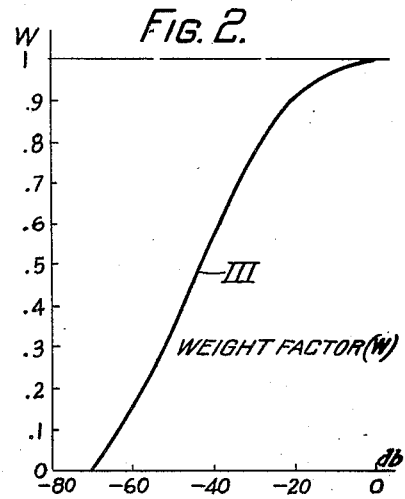
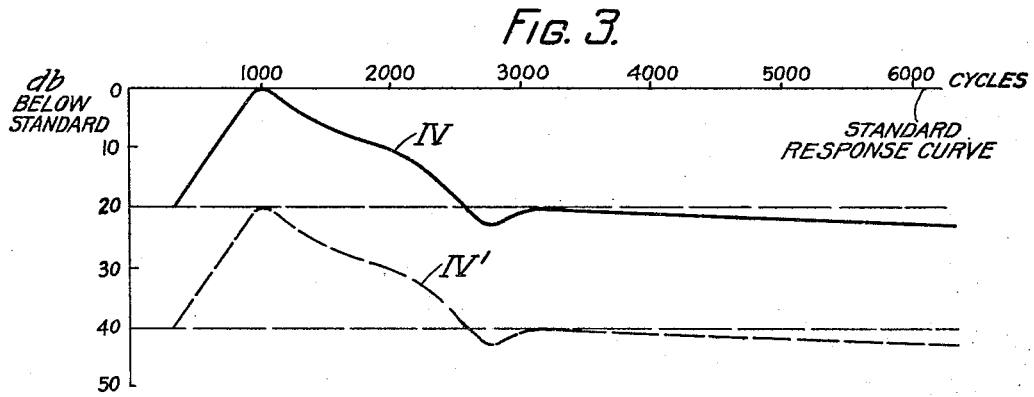
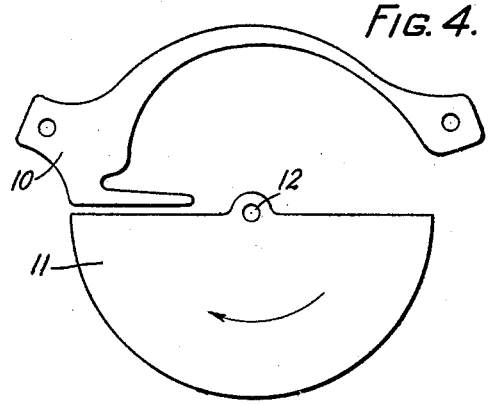
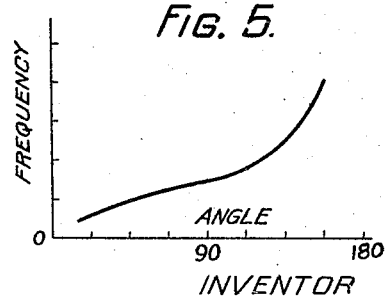
INVENTOR
J. C. STEINBERG
BY
ATTORNEY Feb. 9 1932.  J. C. STEINBERG  1,844,110
DETERMINATION OF TELEPHONE QUALITY
Filed April 17, 1930  2 Sheets-Sheet 2
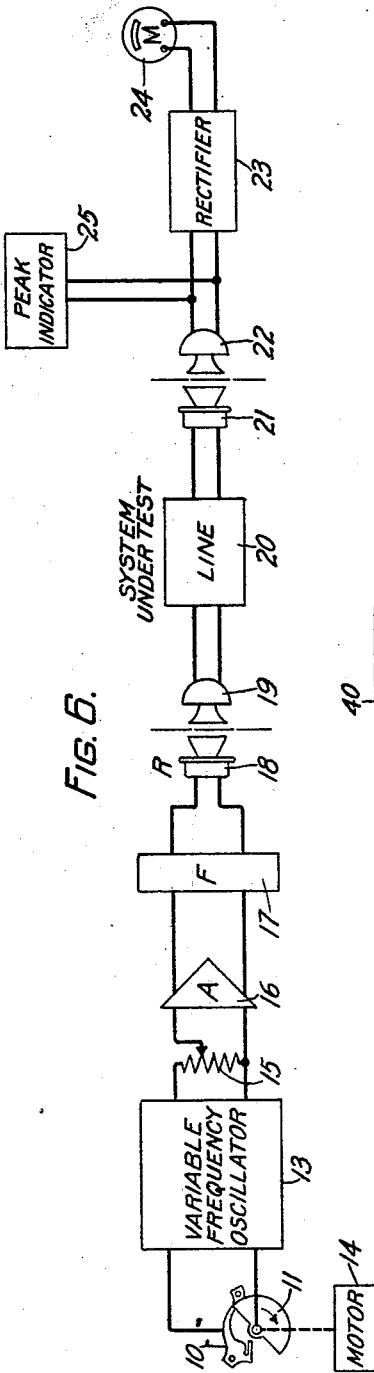
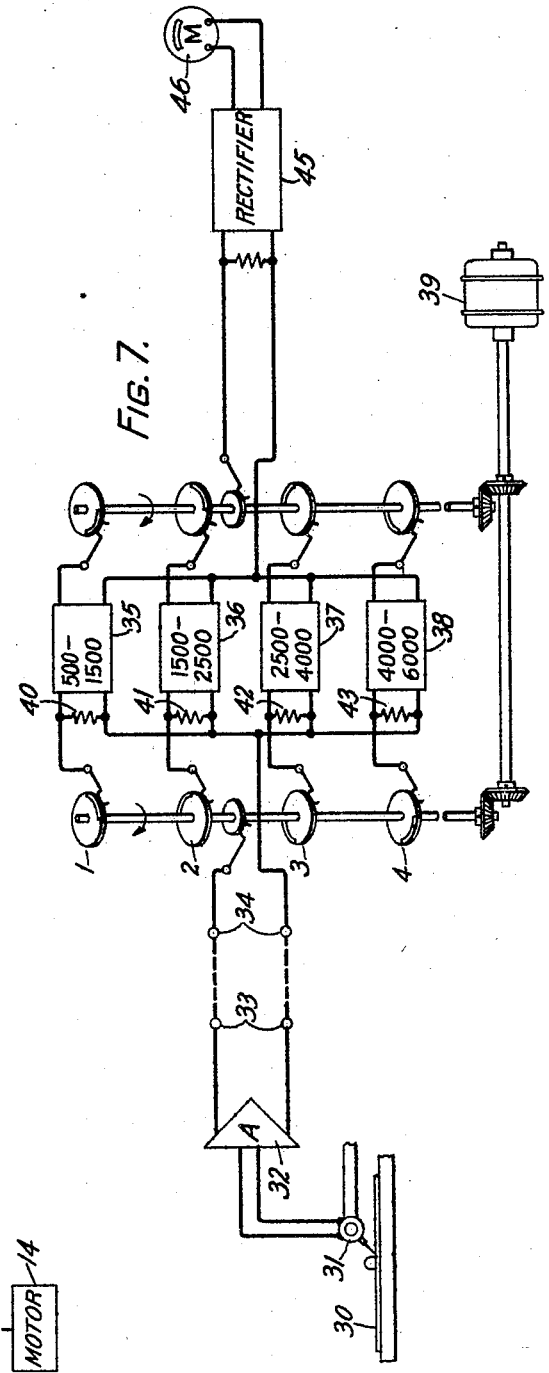
INVENTOR
J. C. STEINBERG
BY
H. A. Burgess
ATTORNEY Patented Feb. 9, 1932

1,844,110

UNITED STATES PATENT OFFICE

JOHN C. STEINBERG, OF EAST ORANGE, NEW JERSEY, ASSIGNOR TO BELL TELEPHONE LABORATORIES, INCORPORATED, OF NEW YORK, N. Y., A CORPORATION OF NEW YORK

DETERMINATION OF TELEPHONE QUALITY

Application filed April 17, 1930. Serial No. 445,045.

The present invention relates to the determination of the degree to which a wave transmission path is free from distortion. This freedom from distortion is a measure of the fidelity with which a system is able to deliver at its output the waves impressed upon its input. It is termed the quality of the system, that is, the quality of speech, music or the like, which it is capable of delivering, assuming a standard quality of input.

It is an object of the invention to determine by direct measurement the quality of a given wave transmission system or element.

Heretofore it has been more often the practice to judge the quality than to obtain a physical measurement of it. Where quality has been determined by measurement this has been done by indirect methods which have proved laborious and time consuming, involving first the making of a frequency-response curve and then deriving from this a weighted curve from which a number indicative of the quality could be obtained by taking the area under the weighted curve.

By the present invention, in its preferred form, the wave transmission system or element whose quality is to be determined is connected into a measuring system and its quality is read directly from a meter, thus avoiding the elaborate and painstaking computations heretofore necessary.

According to the invention, the meter reading which directly gives the quality is the result of an integration involving as essential factors the frequency response of the system, and the weighting or importance factor of each frequency component. By appropriate design of the apparatus, the steps are performed quickly and accurately and, moreover, at the same time so that no successive manipulation is required for the steps in the process but the quality reading is obtained directly and immediately.

For a complete understanding of the invention it will be necessary first to set forth the principles upon which it is based, after which the measuring apparatus and system for carrying out the process will be described. For this purpose reference will be made to the accompanying drawings in which Figs. 1, 2, 3 and 5 show graphs that will be referred to in connection with describing the theory and operation of the invention; Fig. 4 shows a detail of a variable condenser used by applicant, and Figs. 6 and 7 are schematic diagrams of two circuits for practicing the invention.

For purposes of the present invention, the quality, Q, of a wave transmission system is defined as $$Q = \int_0^\infty WD(f)df$$

where $D(f)$ is the importance factor of a given frequency component and $W$ is a weighting factor to be applied to the importance factor. Both $W$ and $D(f) df$ are obtained, in the case of speech transmission, by articulation tests. By the aid of suitable filters which eliminate certain frequency components and admit others, extensive surveys have been made of the essential speech range and a measure has been obtained of the contribution which each frequency component makes to the understandability of speech. Test syllables, or sounds were spoken into a standard quality system under standard volume conditions and the percentage of correctly understood syllables was determined. By sufficiently extensive and continued measurements of this kind, the relative importance to the understandability of speech, of each component throughout the entire frequency range has been found.

The importance function of the frequency components of speech for the given range 0–6000 cycles per second is given by curve I, Fig. 1. This curve was determined by taking the derivative of curve II. Curve II was obtained as follows. By articulation tests, the understandability of a system transmitting the entire 0–6000 frequency range under standard conditions was taken as 100%. A filter was then used to suppress a portion of the range, say the portion from 5000 to 6000 cycles, and the articulation tests were repeated to determine the understandability for this condition. Then a further portion of the frequency range was suppressed, the articulation tests were repeated, and so on until the whole range had been surveyed. Each such test determined a point on the curve II. As would be expected, the understandability decreases as the upper frequency limit is reduced, but decreases much faster over the lower third or half of the range than over the upper part. The importance of any frequency in the range is obtained by measuring the rate at which the understandability changes at that frequency, and that is given by curve I. In the foregoing tests the volume level was, of course, kept constant.

The understandability changes also as the volume level changes, and the problem is considerably simplified by the fact that the rate at which the understandability of speech decreases with decrease from optimum level is approximately the same for all of the important frequencies of speech. This relationship is given in Fig. 2, by curve III. Thus from curve III it is seen that 100% intelligibility or quality is taken as that corresponding to zero or normal level, (70 db. above threshold level). If an attenuation of 20 db. for all frequencies is introduced, curve III shows that the quality has fallen to 92%. At −70 db. level, (by definition of zero or normal level) the received sounds have fallen to the threshold level of audibility.

In Fig. 3, the horizontal line represents a standard response curve and corresponds therefore to 100% quality. The dotted horizontal line at −20 db. level would correspond to 92% quality as above explained. This dotted line characteristic does not, however, represent the sort of problem with which the invention is chiefly concerned, for this characteristic is a horizontal straight line and represents no frequency distortion whatever. It corresponds to a distortionless system operated at a level below normal. The simple expedient of removing attenuation or introducing amplification would restore the system to standard condition. Curve IV represents a characteristic which is curved and irregular, as is more often the case with practical transmission systems.

The quality of a system having the characteristic IV may be obtained with the aid of the curves in Figs. 1 and 2, as will now be explained. It is obvious that the quality of this system is less than 100% since each frequency component except in the region of the 1000 cycle resonant point is below normal level. The amount by which the quality is reduced by reason of the reduction in level from normal of each frequency component depends upon the importance function at that frequency and the volume weighting factor. The quality of the system is determined by the summation of the products of importance function $D(f)$ by volume weight factor $W$ for each frequency component over the entire range, as is evident from the formula for quality $Q$, given above.

This summation can be obtained by plotting $D(f)df$ as abscissae and $W$ corresponding to the limit $f$ as ordinates for various values of $f$. The area under the resulting curve then gives the product of the integral by the weighting factor $W$, which by definition is a measure of the quality.

This summation is performed automatically by the present invention as will now be described. There is first produced a characteristic test wave which is transmitted through the system under test. The response wave as received on the output side of system has undergone a certain amount of distortion, assuming the test system does not give perfect quality. The measure of the quality is obtained from the character of this distortion. There is produced from this response wave a current or voltage which varies in rapidly succeeding instants of time in accordance with the product of the importance function by the weighting factor. These current values are then integrated in a suitable meter or equivalent circuit which can be calibrated directly in quality.

The characteristic test wave is produced in a variable frequency oscillator of special design. The product of the response current by weighting factor is obtained by use of a special rectifier circuit. The integration is obtained by use of an integrating type of meter. These parts of the system will now be described.

The oscillator for producing the test wave is a vacuum tube oscillator whose frequency is determined by a resonant circuit. The condenser of the resonant circuit has a rotating set of plates which are continuously driven by an electric motor. The relation between frequency of oscillation and angle of the rotating condenser plates is given in Fig. 5. This relationship is determined from the importance function (Fig. 1) and is such that the rate of change of frequency bears an inverse relation to the importance function at each frequency. Thus from Fig. 5 is seen that the frequency changes slowly over the lower part of the frequency range, and rapidly over the upper portion. Each frequency component therefore persists for a time proportional to its importance as determined from curve I. Thus for each rotation of the condenser there is sent into the system under test a relatively large amount of energy at the most important frequencies and less energy at the less important frequencies, due to the relative persistence in time of the different frequency components. It will be understood, of course, that the volume level of all of the components is the same.

A shape of condenser plate used by applicant in producing a frequency variation of the type shown in Fig. 5 is illustrated in Fig.

4. Here the stationary bank of plates are at 10 (only one is shown) and the rotating plates are at 11. The plates 11 are uniformly rotated about the axis 12. Plates 11 are semi-circular.

Referring now to Fig. 6, the variable frequency oscillator is diagrammatically indicated at 13. Its frequency-determining circuit includes condenser 10, the movable plates, 11, of which are rotated by motor 14. The output of the oscillator is transmitted through volume level adjusting means (potentiometer 15 and amplifier 16) and, if desired through a filter 17 to eliminate extraneous frequencies, and thence to a sound reproducer 18 of standard characteristics, so that sound waves of the same character as the electrical waves from source 13 are produced in front of the transmitter 19 of the telephone system under test.

This system may be of any type and is shown as comprising a telephone transmitter 19, a line 20, and a telephone receiver 21. If only part of this system is under test the remainder can be made up of standard or previously calibrated parts.

The response sound waves from the output of the system under test are applied to a standard pick-up 22 which may be a condenser transmitter or other instrument of high quality and known characteristic, by which these waves are converted into electrical waves and applied to the rectifier 23.

The rectifier 23 may be of the type disclosed and claimed in U. S. application for Letters Patent, Serial No. 340,576, filed February 16, 1929 by R. H. Galt, and gives an output current varying as the cube root of the applied voltage. It is found that if the weight factor curve of Fig. 3 is plotted to a logarithmic scale of current ratio's (instead of power ratios as in Fig. 2) the slope is about one third over the range of importance. The proper weighting factor is introduced, therefore, by a rectifier having a cube-root relation of output to input.

The meter 24 is any suitable type of integrating meter. Applicant has for this purpose used a Grassot fluxmeter, this instrument being a very sensitive instrument whose sensitivity can be varied throughout a wide range without appreciably affecting its motional properties. Any other suitable type of integrating apparatus or circuit could be used, however, such as a hot-wire instrument.

In using the test system of Fig. 6, the system or apparatus to be tested is put in place between the sound source 18 and the pickup 22. The variable frequency oscillator 13 is put into operation and the output level is adjusted by means of potentiometer 15 or amplifier 16 until the peak indicator 25 shows that the highest volume level of the response wave is up to the zero or normal level. Thus, referring to Fig. 3, if the total attenuation of the system should be such as to make the response curve appear at the dotted position IV'; the level would be adjusted to bring it up to the full line position IV where the peak of the curve coincides with the zero level. For a 100% quality system the peak indicator would give a steady reading (corresponding to the horizontal line of Fig. 3, standard response curve). For a characteristic like IV, the peak indicator will vibrate, but the maximum reading will coincide with normal or zero level. With the adjustments as above indicated, the quality of the system or apparatus under test is read directly from meter 24.

While the testing system of Fig. 6 is the preferred system it is obvious that it may be changed widely both as to general lay-out and as to the individual pieces of apparatus without departing from the invention. For example, the source of acoustic test waves produced in front of the transmitter 19 may be derived directly from a phonograph record on which there has been recorded a wave which varies in time and in frequency in the manner described of the electrical wave from oscillator 13.

The foregoing method and system depend upon the use of a special test wave as described. It is not necessary, however, in order to practice the present invention to use a special wave having but a single frequency at any instant. It is possible also to use speech sounds as the test waves. Referring to Fig. 7, for example, let it be assumed that typical speech is recorded on the phonograph record 30 which is driven at a constant speed. These speech waves are transmitted into electrical waves by the magnetic pick-up 31 and are amplified at 32. The apparatus to be tested is inserted between the pair of terminals 33 and the pair of terminals 34. If the system under test utilizes acoustical waves these may be derived from the phonograph record 30 by use of an acoustical reproducer, or they may be derived from the electrical waves in the output of amplifier 32 as in the case of Fig. 6, in which latter case terminals 34 correspond to the output of transmitter 22 of Fig. 6.

Between terminals 34 and rectifier 45 are included a bank of electrical wave filters 35, 36, 37 and 38, each designed to transmit a relatively narrow portion of the speech frequency range. These filters may be designed in accordance with the principles disclosed in U. S. patent to G. A. Campbell, 1,227,113, May 22, 1917. These filters are arranged to be cut into the circuit in succession one at a time by suitable switching apparatus as indicated. For example, a motor 39 drives two series of commutator discs arranged respectively to control the input connections and the output connections of the filters, so as to connect the filters in the circuit individually for appropriate lengths of time. The time of connection of any filter in the circuit is proportional to $$\int_{f_1}^{f_2} D(f) df$$

where $f_1$ and $f_2$ are the edges of the transmitted band, the whole expression being the importance factor for the band of frequencies in question.

Since the volume level of normal speech varies widely over the speech frequency band it is necessary to associate with each of the filters 35 to 38 an individual resistance 40, 41, 42 or 43 to equalize the voltages transmitted through the various filters in order to make the conditions fit the requirements stated in connection with the more complete description of the general method in connection with the curves of Figs. 1 and 2 and the system of Fig. 6.

The rectifier 45 and meter 46 may be the same as elements 23 and 24 of Fig. 6.

In the operation of Fig. 7, speech waves recorded on record 30 generate waves which are transmitted through the apparatus or system under test and different frequency bands selected from different portions of the transmitted range are impressed for appropriate lengths of time, in rapid succession, on the rectifier 45 to result in a direct reading of quality on the indicating meter 46.

One advantage of using the speech as the test wave is that it will measure the effects upon quality of apparatus with non-linear as well as linear frequency distortion because the circuit under test is dealing with the same character of wave that the system transmits in actual use. The use of speech waves for testing purposes is advantageous, for example, in testing granular carbon transmitters since the speech waves agitate the carbon in the same way as under actual conditions of use.

It is also possible to secure a direct measurement of quality by the use of selected speech sounds which themselves have the proper amplitude frequency and time relations to meet the conditions imposed by the formulæ that have already been given and that were described in connection with the previous curves.

For example, in Fig. 7 let it be assumed that terminals 34 are directly connected to the input of the rectifier 45 without the interposition of any of the filters 35 to 38. In this case it is desirable to have a filter similar to filter 17 of Fig. 6, inserted in the output of amplifier 32 and suppressing all frequency components below 500 cycles per second. Record 30 instead of having recorded upon it natural or typical speech, contains a record of speech sounds having their principal components in certain well-defined bands, as determined from the following table:

*Table I*

| Speech sounds | Band | Relative db. above threshold | Duration |
|---|---|---|---|
| | | | Sec. |
| a | 500–1000~ | 87.2 | .3 |
| o | 500–1500~ | 89.4 | .2 |
| ō | 500–1500~ | 89.4 | .3 |
| ā | 1500–4000~ | 83.1 | .3 |
| i | 1500–4000~ | 82.4 | .2 |
| ē | 1500–4000~ | 79.2 | .3 |
| ch | 4000–6000~ | 76.7 | .1 |
| sh | 4000–6000~ | 78.7 | .2 |
| s | 4000–6000~ | 72.2 | .25 |

It will be noted from column 3 that the amplitudes of the various sounds differ by amounts up to 17 db. so that equal amplitudes are not impressed upon the rectifier. However, by selecting appropriate sounds and by making the sounds of weaker amplitude recur sufficiently often, having due regard to the duration of the sound, the proper test conditions to meet the requirements of the foregoing theory and formulæ can be obtained.

For example, the sentence "The sea swishes across its ships" has the proper distribution of speech sounds to give a direct reading of quality on meter 46 when impressed on the input of the system at proper amplitude.

In order to rate the apparatus under test one of two procedures may be followed. The quality of a reference condition (a carbon transmitter and its associated typical circuit, for example) may be determined in the ordinary way so that we have $K_s$, $Q_s$, where $K_s$ refers to the fluxmeter reading that is obtained when the sentence is spoken into the standard transmitter, and $Q_s$, the quality assigned to this instrument when used under the specified conditions. Then, $$Q_t = \frac{K_t}{K_s} Q_s$$

where $K_t$ is the fluxmeter reading obtained when the sentence is spoken into the test transmitter and $Q_t$, the quality that would be obtained for this transmitter if it were to be substituted for the standard in the typical circuit.

There are many advantages to dealing not with the quality, but with the "quality or interpretation equivalent" L which is defined as the amount of distortionless attenuation in $db$. that must be introduced or removed from the reference condition in order that $Q_s = Q_t$. L can either be measured directly or calculated from the two readings $K_s$ and $K_t$ by means of the relation $$L = 60 \log \frac{K_t}{K_s}.$$

What is claimed is:

1. The method of measuring the quality of a wave transmission path comprising applying thereto a test wave having a plurality of frequency components, the energy of the various frequency components of which is proportional to the importance factor for the type of transmission for which the system is designed, integrating said wave after its passage through the path under test, and translating the wave as received directly into a measure of the quality.

2. A system for measuring the quality of a wave transmission path comprising means to transmit through the path a test wave, a response device operated by the wave as received, the response characteristic of the device and the character of the test wave combining to cause the response device to give directly the transmission quality of the path.

3. A system for measuring the quality of a transmission path, comprising an instrument calibrated in quality units, means for determining the reading of said instrument in response to waves received over said path, and means for sending through the path a test wave of a character to produce in said instrument a direct indication of the transmission quality of the path.

4. A system for measuring the transmission quality of a wave transmission path, comprising means to transmit over the path a test wave whose frequency-time characteristics are related to the importance factor of speech components, and means to translate the wave as received from the path into a measure of the transmission quality.

5. In a system for measuring transmission quality, means to impress on the element under test, frequency components occupying different frequency positions in the transmission band, said components having relative time durations dependent upon their relative contributions to quality, means to integrate the components after traversing the element under test, and means to measure the integrated product.

6. In a system for measuring transmission quality, a source of input frequency components, means to impress said components on the element under test, means to translate the resulting response into increments of energy which are proportional to the product of the amplitude and frequency importance functions, and means to measure the summation of said products.

7. A system for measuring the quality of telephone equipment, comprising a variable frequency oscillator producing a wave whose rate of frequency variation is inversely related to the importance function of the frequency components of speech, means to impress waves produced from said oscillator on the equipment to be tested, a circuit translating the response voltage into current whose amplitude varies from instant to instant as the cube root of the response wave, and means measuring the summation of said current amplitudes.

8. The combination of a wave producer and a wave distorter cooperating to produce output components proportional to the product of the amplitude and frequency importance functions of speech components, and means for inserting a transmission path between said wave producer and wave distorter.

9. In combination, a source of variable frequency waves of constant amplitude the components of which persist in time proportionately to the importance function of speech, means to impress said waves on a transmission path and means to derive a measure of quality from the response waves on the output side of said path.

10. A telephone quality measuring system comprising a variable frequency source producing a wave whose frequency varies inversely relative to the importance function of speech sounds, said wave having constant amplitude, means to translate said waves into corresponding acoustic waves and to impress the later on the microphone of the system under test, means to translate the output acoustic waves from the receiver of the system under test into electrical waves, means to derive from such electrical waves currents instantaneously varying according to the cube root of such electrical waves, and an integrating meter for said currents, calibrated in quality units.

In witness whereof, I hereunto subscribe my name this 16th day of April, 1930.

JOHN C. STEINBERG.